(No Model.)

A. P. GILLETT.
MOWING AND REAPING MACHINE.

No. 362,155. Patented May 3, 1887.

Witnesses:
C. T. Coleman
C. J. Main

Inventor:
Allen P. Gillett

UNITED STATES PATENT OFFICE.

ALLEN P. GILLETT, OF CANTON, ILLINOIS.

MOWING AND REAPING MACHINE.

SPECIFICATION forming part of Letters Patent No. 362,155, dated May 3, 1887.

Application filed November 26, 1886. Serial No. 219,986. (No model.)

*To all whom it may concern:*

Be it known that I, ALLEN P. GILLETT, a citizen of the United States, residing at Canton, in the county of Fulton and State of Illinois, have invented a new and useful Improvement in Mowing and Reaping Machines, of which the following is a specification.

My invention relates to the mechanism for operating the sickle; and the objects of my improvement are, first, to reduce the friction of operating the machines; second, to reduce the weight, and, third, to reduce the cost of manufacture of the machines. I attain these objects by the mechanism illustrated in the accompanying drawings, in which—

Figure 1:
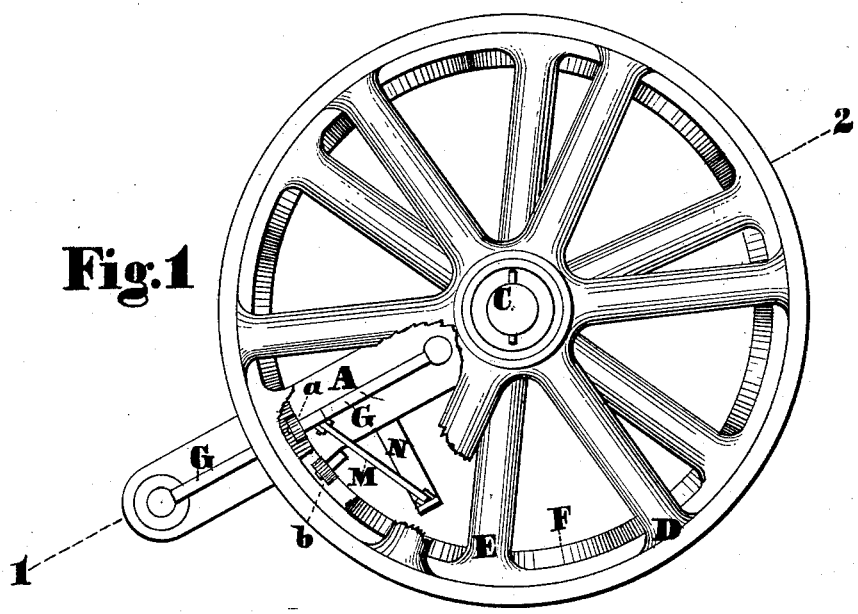
Figure 2:
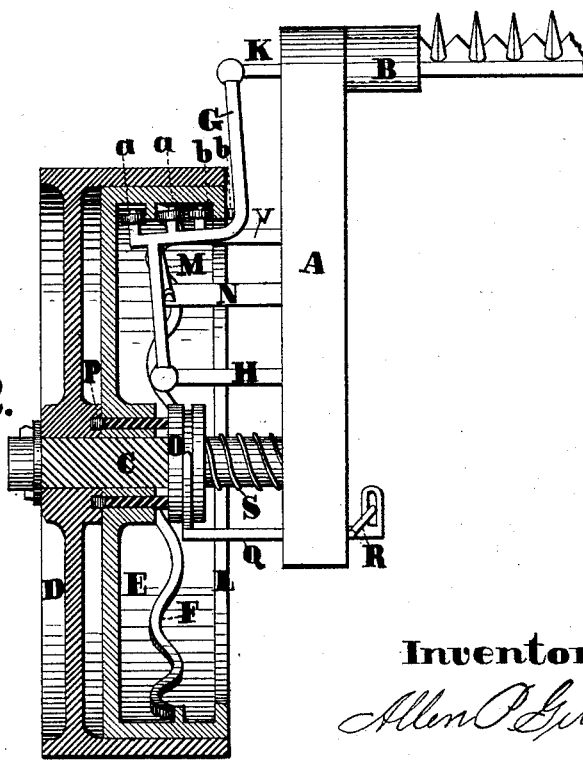

Figure 1 is a side elevation of the machine with parts broken away; and Fig. 2 is a sectional plan view drawn on the line of 1 2, Fig. 1.

Similar letters refer to similar parts throughout the several views.

A is the frame, having a tubular stud or journal fitting in socket of the sickle-bar B.

C is the axle on which the drive wheel D and the cam-wheel E turn.

F is a zigzag cam on the inner side of the rim of the cam-wheel E, which, as the wheel turns, gives a reciprocating motion to the lever G, which operates the sickle. The lever G is pivoted to the projecting arm H of the frame, and is connected to the sickle by the pitman K, passing through the tubular stud or journal of the frame.

*a a* are anti-friction wheels on the lever G, and bearing on opposite sides of the cam F.

L is a flange on the edge of the cam-wheel E, and *b b* are anti-friction wheels on an arm, V, of the frame A, and bearing on opposite sides of the flange L and preventing the wheel from wabbling on the axle C.

M is a bar pivoted at the lower end to the arm N of the frame and at the upper end to the lever G, so as to resist the downward thrust of the cam F as the wheel E turns.

O is a collar on the axle C, with two bolts passing through openings in the hub of wheel E and engaging ratchet-teeth in the hub of the drive-wheel D at P, so that the machine may be backed without operating the sickle, or may be thrown out of gear by the bar Q and the crank R. A spiral spring, S, around the axle C, between the frame A and the collar O, holds the bolts in mesh with the ratchet-teeth when the machine is in operation.

What I claim as my invention, and desire to secure by Letters Patent, is—

The combination, in a reaping or mowing machine, of the frame A, the wheel E, the cam F, a lever, G, anti-friction wheels *a a*, a flange, L, and anti-friction wheels *b b*, the pivoted bar M, connected with the lever G, and the bar N.

ALLEN P. GILLETT.

Witnesses:
C. T. COLEMAN,
C. J. MAIN.